United States Patent [19]

Lieb et al.

[11] 4,124,471
[45] Nov. 7, 1978

[54] CONTROLLING SILICA SOL PARTICLE SIZE

[75] Inventors: Donald F. Lieb, Mentor, Ohio; Thomas T. Sugano, Hayward, Calif.

[73] Assignee: Diamond Shamrock Corporation, Cleveland, Ohio

[21] Appl. No.: 826,511

[22] Filed: Aug. 22, 1977

[51] Int. Cl.² ............................................. B01D 13/02
[52] U.S. Cl. ........................... 204/180 P; 204/101; 423/333; 423/338; 423/339
[58] Field of Search .............. 204/101, 180 P, 301; 423/333, 338, 339

[56] References Cited

U.S. PATENT DOCUMENTS

| | | | |
|---|---|---|---|
| 1,562,940 | 11/1925 | Collins | 204/101 |
| 3,654,105 | 4/1972 | Chilton | 204/101 |
| 3,654,865 | 4/1972 | Tamal | 101/463 |
| 3,668,088 | 6/1972 | Iler | 204/101 |
| 3,723,273 | 3/1973 | Wilson et al. | 204/180 P |

*Primary Examiner*—Arthur C. Prescott
*Attorney, Agent, or Firm*—Bruce M. Winchell

[57] ABSTRACT

A novel method of controlling electrodialytically produced silica sol particle size and concentration comprising effecting electrodialysis of an alkali metal silicate anolyte in an electrodialysis cell with a cation permselective membrane separating the anolyte and the catholyte while adding alkali metal silicate solution to the anolyte to maintain the desired pH whereby a silica sol with increasing particle size is formed and when the silica sol has reached the desired particle size, continuing electrodialysis with addition of an alkali metal hydroxide solution to control the pH until the silica sol has the desired concentration.

10 Claims, 3 Drawing Figures

CONTROLLING SILICA SOL PARTICLE SIZE

BACKGROUND OF THE INVENTION

A major user of silica sol is the steel industry since the steel mills use sols as a binder in the makeup of the stools on which a hot ingot cools. The sol acts as a thermal insulator, or an anti-bonding agent, to keep the hot ingot from sticking to the stool. Another major user is the investment casting industry wherein the investment caster uses the sol as a binder for very high precision casting molds. Other interesting side uses for silica sol are in the floor polish and toothpaste industries. In floor polish, sols act as anti-slip agents. Also because the particles are very small, there is virtually no light scattering, and the polish is clear. In toothpaste, colloidal silica, in the form of silica gel, is used as an abrasive. The silica particles are much smaller than the normally used phosphate particles and this results in less tooth enamel abrasion.

Various techniques for producing silica sols are known to the art. For example, U.S. Pat. No. 1,562,940 concerns a process for producing silicic acid electrolyzing an aqueous solution of water glass between an anode and a mercury cathode while continuously agitating the anode by having means affixed thereto to effect its rotation.

In U.S. Pat. Nos. 3,654,105 and 3,654,865, general techniques for producing silica sols are disclosed which include the step of passing an electric current between an anode and a cathode which are positioned in a specified electrolyte with the anode being fabricated from silicon or a silicon containing material.

U.S. Pat. No. 3,668,088 discloses an electrodialysis process for making silica sols. In this electrodialysis process, a sol-electrolyte containing an aqueous sodium silicate solution is electrolyzed while separated from an acid anolyte by a cation-permeable, anion-impermeable membrane. Hydrogen ions from the anolyte are drawn through the membrane into the sol-electrolyte and sodium ions are removed from the electrolyte by bringing them into contact with a mercury cathode so as to form a mercury-sodium amalgam. The silica from the sodium silicate deposits on the silica particles present in the sol-electrolyte. U.S. Pat. No. 3,723,273 discloses the electrodialytic production of stannic oxide sols with a cation permselective membrane.

In commonly assigned U.S. patent application Ser. No. 669,188 filed Mar. 21, 1976 now abandoned, there is described a method of producing a silica sol by electrodialytically transferring alkali metal cations of a water-soluble alkali metal silicate from an anode compartment of an electrolytic cell to a cathode compartment of the electrolytic cell while essentially preventing the migration of silica into the cathode compartment by positioning a cation permselective membrane between the anode compartment and the cathode compartment, and removing the so-produced silica sol from the anode compartment of the electrolytic cell. Deposition of silica on the anode is avoided by careful control of the pH of the anolyte at a value from about 7.5 to about 8.5, preferably 8 to 8.2.

SUMMARY OF THE INVENTION

It is an object of the invention to provide a novel process for controlling electrodialytically produced silica sol particle size and concentration comprising effecting electrodialysis of an alkali metal silicate anolyte in an electrodialysis cell with a cation permselective membrane separating the anolyte and the catholyte while adding alkali metal silicate solution to the anolyte to maintain the desired pH whereby a silica sol with increasing particle size is formed and when the silica sol has reached the desired particle size, continuing electrodialysis with addition of an alkali metal hydroxide solution to control the pH until the silica sol has the desired concentration.

It is a further object of the invention to provide a novel silica sol having a more uniform particle size distribution which gives the sol more uniform properties.

These and other objects and advantages of the invention will become obvious from the following detailed description.

DESCRIPTION OF THE PREFERRED EMBODIMENT

The novel process of the invention for controlling silica sol particle size and concentration comprises effecting electrodialysis of an alkali metal silicate anolyte in an electrodialysis cell with a cation permselective membrane separating the anolyte and the catholyte while adding alkali metal silicate solution to the anolyte to maintain the desired pH whereby a silica sol with increasing particle size is formed and when the silica sol has reached the desired particle size, continuing electrodialysis with addition of an alkali metal hydroxide solution to control the pH until the silica sol has the desired concentration.

The novel process enables one to produce silica sols of any desired concentration or any desired particle size which has not been possible with process of the prior art. Each different particle size of silica sols has different commercial uses. The electrodialysis of an alkali metal silicate solution causes the alkali metal ion with water of hydration to pass through the permselective membrane to form an alkali metal hydroxide in the catholyte chamber and particles of $SiO_2$ form in the anolyte. As the electrodialysis is continued, particles of $SiO_2$ increase in size but when alkali metal silicate feed is replaced with an alkali metal hydroxide solution, the $SiO_2$ particle growth ceases. However, continued electrodialysis will increase the concentration of the silica sol due to continued removal of alkali metal ions with water of hydration.

The continued electrodialysis will remove more water from the silica sol due to the number of molecules hydrated with the alkali metal ion. For example, each mole of sodium ion has a hydration sphere of 4 to 8 mols of water and therefore, water is effectively removed from the silica sol after particle growth has ceased to obtain a sol of any desired concentration.

Figure 1:
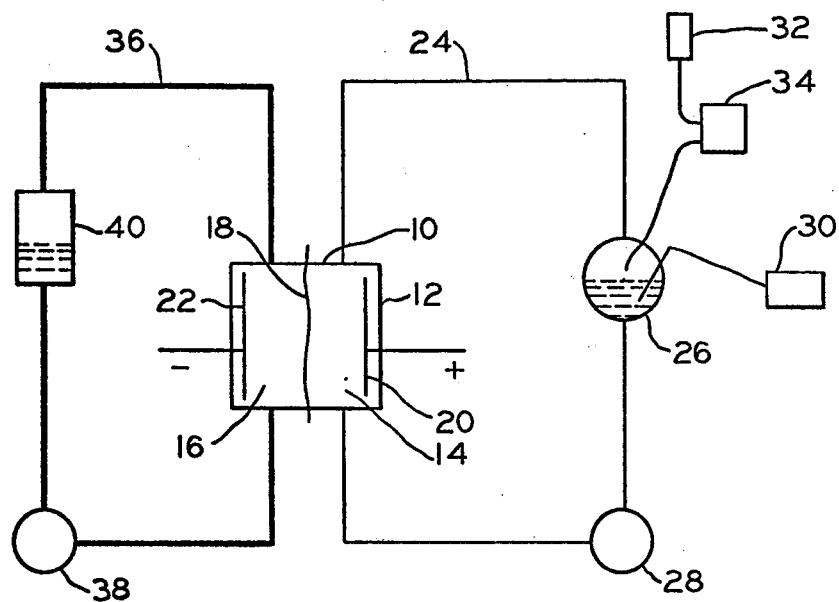
FIG. 1 is a diagrammatic illustration of an apparatus suitable for practicing the subject invention.

FIG. 1 is a diagrammatic illustration of an apparatus suitable for the practice of the invention. Specifically, electrodialysis cell 10 is shown having an enclosing housing 12 which defines an anode compartment 14 and cathode compartment 16, which are separated from each other by a cation permselective membrane 18. An anode 20 is positioned in the anode compartment and a cathode 22 is located in the cathode compartment. An anolyte circulating loop or means 24 is in fluid communication with the anode compartment 14 for convenient addition of alkali metal silicate solution or alkali metal hydroxide solution to control the pH. The anolyte circulating means includes a reservoir 26 and a pump 28. The reservoir is provided with a pH measuring means 30 and is in fluid communication with a feed reservoir 32 through a feed control means 34. If desired the feed means can be in electrical contact with the pH measuring means 30 for controlling its activation. The catholyte circulating loop or means 36 includes a pump 38 and a reservoir 40 and is in fluid communication with the cathode compartment 16.

Figure 2:
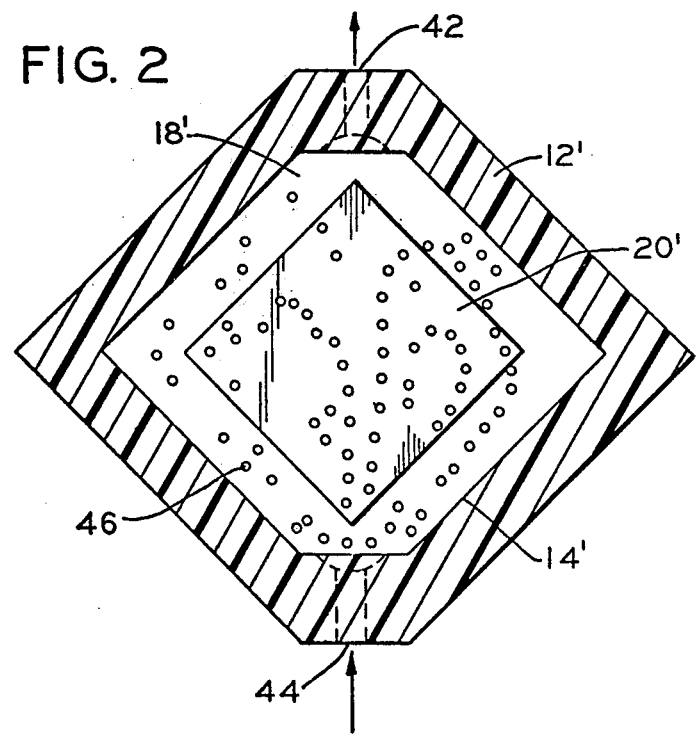
FIG. 2 is a section view of a preferred anode compartment configuration for practicing the subject invention.

FIG. 2 is a diagrammatical illustration of the preferred anode compartment configuration and includes a housing 12', which is is generally diamond-shaped in vertical cross-section, having a hollow interior which defines the anode compartment 14'. This compartment is defined by the housing which has first and second end members. The uppermost portion of the housing is provided with an outlet 42 for anolyte removal while the lowermost portion has an inlet 44 for addition of anolyte. The anode compartment contains an anode 20'. One end of the compartment is closed by the first end member, i.e., by permselective member 18'. The opposite end of the compartment is covered (not shown) by a second end member, which can be fabricated from any suitable material. If desired, a plurality of particles 46, preferably glass beads, are positioned in the anode compartment 14'. As anolyte is circulated through the anode compartment, these particles are fluidized. If desired, the cathode compartment can be fabricated so as to have the same general configuration as the anode compartment with the only essential difference being in the specific type and configuration of electrode (cathode) utilized.

The electrodes utilized in the electrolytic cell can be fabricated from any suitable material, as long as the material is compatible with the specific environment found in the cell. In the preferred practice of the invention the anode 20 or 20' is fabricated of a valve metal such as titanium, tuntalum, zirconium, niobium or hafnium and has on the surface thereof a conductive coating of a platinum group metal, metal oxide or mixture thereof as described in U.S. Pat. Nos. 3,778,307 or 3,711,385, for example. the anode 20 or 20' is usually in sheet form. The cathode 22 can be fashioned from any suitable material such as steel, stainless steel, nickel or iron, and a cathode 22 of steel mesh has been found to exhibit exceptional performance characteristics.

The permselective membrane 18 must be cation permeable. Generally, the membrane 18 may be either a polymer containing copolymerized sulfonated styrene or a polymer containing copolymerized unsaturated carboxylic acids. The former are known as "sulfonic acid type membrane" and the latter are known as "carboxylic acid type membranes."

The hydraulically impermeable cation exchange membrane which will accomplish the objects of the invention as stated hereinabove has a substrate film material. The substrate material may be any of a number of commercially available hydraulically impermeable cation exchange membranes which are chemically resistant to the electrolytes to be used in the electrolyte cell for the particular process for which the membrane is desired, as long as it has a low resistance value so as to accomplish a high current efficiency for the given cell, and a sufficient lifetime so as to make its use in the given electrolytic cell economical for commercial electrochemical production.

One type of substrate material which may be used in the present invention is a thin film of fluorinated copolymer having pendant sulfonic acid groups which is derived from monomers of the formula $$CF_2=CF(R)_nSO_2F \qquad \text{I}$$

in which the pendant $-SO_2F$ groups are converted to $-SO_3H$ groups, and monomers of the formula $$CF_2=CXX^1 \qquad \text{II}$$

wherein R represents the group $$-CF-CF_2-O-\underset{|}{\overset{R^1}{\phantom{C}}}\,(-CFY-CF_2-O-)_m$$

in which the $R^1$ is fluorine or fluoroalkyl of 1 to 10 carbon atoms; Y is fluorine or trifluoromethyl; $m$ is 1, 2, or 3; $n$ is 0 or 1; X is fluorine, chlorine or trifluoromethyl; and $X^1$ is X or $CF_3(CF_2)_a$, wherein $a$ is 0 or an integer from 1 to 5. The results in copolymers having the repeating structural units $$\begin{array}{c}-CF_2-CF-\\ |\\ (R)_n\\ |\\ (SO_3H)\end{array} \qquad \text{III}$$

and $$-CF_2-CXX^1- \qquad \text{IV}$$

In the copolymer, there should be sufficient repeating units according to formula III above, to provide a $-SO_3H$ equivalent weight of about 1000 to 1400. Materials having a water absorption of about 25 percent or greater are preferred since higher cell voltages at any given current density are required for materials having less water absorption. Similarly, materials having a film thickness (unlaminated) of about 8 mils or more, require higher cell voltages resulting in a lower power efficiency.

Typically, because of the large surface areas of the membrane in commercial cells, the substrate film material will be laminated to and impregnated into a hydraulically permeable, electrically non-conductive, inert, reinforcing member, such as a woven or non-woven fabric made of fibers of asbestos, glass, TEFLON, or the like. In film fabric composite materials, it is preferred that the laminating produce an unbroken surface of the film resin on at least one side of the fabric to prevent leakage through the substrate film material.

The materials of this type are further described in the following patents which are hereby incorporated by reference: U.S. Pat. Nos. 3,041,317; 3,282,875; 3,624,053; British Pat. No. 1,184,321 and Dutch published application No. 72/12249 corresponding to U.S. Pat. No. 3,184,399. Substrate materials as aforedescribed are available from E. I. duPont deNemours and Co. under the trademark NAFION.

A second type of substrate material has a backbone chain of copolymers of tetrafluoroethylene and hexafluoropropylene and grafted onto this backbone a 50-50 mixture of styrene and alpha methyl styrene. Subsequently, these grafts may be sulfonated or carbonated to achieve the ion exchange characteristic. This type of substrate while having different pendant groups has a fluorinated backbone chain so that the chemical resistivities are reasonably high.

Another type of substrate film material would be polymeric substances having pendant sulfonic acid groups wherein the polymeric backbone is dervied from the polymerization of a polyvinyl aromatic component with a monovinyl aromatic component in an inorganic solvent under conditions which prevent solvent evaporation and result in a generally copolymeric substance although a 100 percent polyvinyl aromatic compound may be prepared which is satisfactory.

The polyvinyl aromatic component may be chosen from the group including: divinyl benzenes, divinyl toluenes, divinyl napthalenes, divinyl diphenyls, divinyl-phenyl vinyl ethers, the substituted alkyl derivatives thereof such as dimethyl divinyl benzenes and similar polymerizable aromatic compounds which are polyfunctional with respect to vinyl groups.

The monovinyl aromatic component which will generally be the impurities present in commercial grades of polyvinyl aromatic compounds include: styrene, isomeric vinyl toluenes, vinyl napthalenes, vinyl ethyl benzenes, vinyl chlorobenzenes, vinyl sylenes, and alpha substituted alkyl derivatives thereof, such as alpha methyl vinyl benzene. In cases where high-purity polyvinyl aromatic compounds are used, it may be desirable to add monovinyl aromatic compounds so that the polyvinyl aromatic compound will constitute 30 to 80 mole percent of polymerizable material.

Suitable solvents in which the polymerizable material may be dissolved prior to polymerization should be inert to the polymerization (in that they do not react chemically with the monomers or polymer), should also possess a boiling point greater than 60° C., and should be miscible with the sulfonation medium Polymerization is effected by any of the well known expedients for instance, heat, pressure, and catalytic accelerators, and is continued until an insoluble infusible gel is formed substantially throughout the volume of solution. The resulting gel structures are then sulfonated in a solvated condition and to such an extent that there are not more than four equivalents of sulfonic acid groups formed for each mole of polyvinyl aromatic compound in the polymer and not less than one equivalent of sulfonic acid groups formed for each ten moles of poly- and monovinyl aromatic compound in the polymer. As with the NAFION type material, these materials may require reinforcing of similar materials.

Substrate film materials of this type are further described in the following patents which are hereby incorporated by reference: U.S. Pat. Nos. 2,731,411 and 3,887,499. These materials are available from Ionics, Inc. under the trademark IONICS CR6.

The anolyte is an aqueous solution of at least one water-soluble alkali metal silicate. Preferably, it is an aqueous solution of sodium silicate or potassium silicate. On start-up, the silicate is preferably present in an amount ranging from about 0.1 to about 5.0 percent (as $SiO_2$). Obviously, during operation of the cell the concentration of silica sol in the anolyte will increase. Typically, during cell operation, the concentration of silica sol can range from about 5 to about 50 preferably 20 to 30 weight percent.

In addition, it is noted that the anolyte on start-up should contain some silica sol to serve as a nucleation agent. It is preferred that about 1 weight percent metal sol be present on initial cell start-up, with the minimum being about 0.1 percent. This is accomplished such as by heating an aqueous solution of sodium silicate to a suitable temperature.

The catholyte may be a solution of at least one alkali metal hydroxide. Preferably, the alkali metal hydroxide used is sodium hydroxide. The alkali metal hydroxide generally is present in an amount ranging from about 1 to about 20 percent, with about 5 percent being preferred. This is the catholyte concentration on start-up and obviously, the concentration of sodium hydroxide will increase during operation of the cell.

In the preferred embodiment of the invention, a plurality of particles (beads) are placed in the anode compartment. As anolyte is circulated through the anode compartment via the anolyte loop, these beads are fluidized. This causes the beads to randomly impinge upon the surface of the anode and thereby substantially prevent silica from being deposited or building up on the anode surface. In practice, it is preferred to utilize beads (or particles) which are non-conductive. The size thereof is not critical, but they must be sufficiently small to be fluidized by anolyte flow.

In the preferred cell arrangement, the anolyte loop is provided with a reservoir which is in communication with a pH meter and a source of alkali metal silicate and alkali metal hydroxide solutions. If desired, the pH meter and the source of silicate or hydroxide can be coupled together so that silicate or hydroxide can be added to the anolyte as a function of pH or pH change. The catholyte loop is simply provided with a reservoir for storing and, if desired, removing catholyte. Obviously, both loops can be actuated in any known manner, for example, by means of conventional pumps.

In use, direct electrical current is passed between the anode and the cathode. When such a current is applied, oxygen gas is produced at the anode and hydrogen is generated at the cathode. These gases may be collected, if desired, or simply vented out of the system by any convenient means.

During the formation of the silica sol, the temperature of the anolyte is maintained at least at a level where $SiO_2$ particle nuclei formation occurs, usually in excess of about 60° C., with preferred temperature range being from about 60° to about 80° C.

The electrolytic cell may be operated at an anode current density ranging from about 0.1 to about 2 amperes per square inch, with the preferred current density ranging from about 0.75 to about 1 amperes per square inch. The cell voltage can be generally maintained in the range of from about 10 to about 30 volts, with the preferred voltage ranging from about 10 to about 15 volts.

In operation, care must be taken to prevent the deposition of silica on the anode or gelling of the sol. In addition to, but independent from, the before discussed mechanical means (bead fluidization), the silica deposition can be avoided by carefully controlling the pH of the anolyte. This is done to keep the sodium concentration constant. In practice, it has been found that silica deposition can be essentially prevented by maintaining the pH of the anolyte in a range of from about 7.5 to about 8.5. This is effected by monitoring the pH of the anolyte during electrodialysis and as it approaches a pH of about 8 metering into the anolyte an amount of silicate or hydroxide sufficient to keep the pH at the desired level. It has been quite unexpectedly discovered that this pH control technique enables one to produce silica sols having a solid content ranging from about 1 to about 30 percent without causing the anode to lose its electrical efficiency due to the deposition of silica thereon.

Obviously, the present invention can be practiced in a single or multiple cell arrangement. In addition, various cell designs and configurations can be utilized. Essentially, all that is required is that anode and cathode compartments be provided which are separated from each other by a cation permselective membrane.

One of the unexpected advantages of the silica sols produced by the process of the invention besides good stability as seen from a prolonged shelf life is a narrow distribution of particle size in the product. This probably contributes to the sol stability since charge imbalance of different size particles can effect the stability of the sol.

There are a combination of factors which results in a narrower particle size distribution for electrodialytic sols as compared to the prior art sols. In the ion exchange silica sol process, the reaction rate decreases as the active sites on the resin become spent. As a result of this changing rate, particles at the end of the process will not have a chance to grow as rapidly as the first particles. In the present electrodialysis, although the overall process is batch, the growth of particles is continuous and as silica molecules become available for particle growth, all the particles have an equal opportunity to have that molecule attach to it. This keeps the particle size distribution range narrower.

In the following examples there are discribed several embodiments to illustrate the invention. However, it is to be understood that the invention is not intended to be limited to the specific embodiments.

EXAMPLE 1

Into an electrolytic cell of the type described above was placed anolyte containing 2 weight percent $SiO_2$ in the anode compartment. The cathode compartment was filled with a 5 percent sodium hydroxide solution. At this point, slow electrolysis was started at about $\frac{1}{4}$ asi (amperes per square inch). The original voltage was approximately 4.5 volts. The pH monitored and found to be about 8.12. Electrolysis at $\frac{1}{4}$ asi was continued until the pH dropped to about 8.0, with the cell voltage now at 22 volts. The pH was then maintained at this level by adding sodium silicate to the anolyte, as necessary. The addition of sodium silicate was accomplished by means of a peristaltic pump which pumped material from a reservoir into the anolyte via the anolyte loop. The concentration of the sodium silicate in the reservoir or storage vessel was about 40 percent solids (with $SiO_2$ content being 29 percent). The temperature reached a maximum of 70° C. p When the voltage of the cell dropped to about 15 volts, the current density was increased by one-eighth asi and the system restabilized by the addition of additional sodium silicate. The current density was then further increased in one-eighth asi increments, while stabilizing the anolyte as above-described, until a final current density of 1 asi was achieved. The denisty of anolyte was monitored and used as a means of indicating the amount of silica sol found in the anolyte. The foregoing system was operated for six hours and then the pH was maintained by periodic addition of sodium hydroxide solution for one hour. The anolyte was removed therefrom. The resultant silica sol had a concentration of about 20 percent silica. The average particle size of silica was about 12 millimicrons with a median size of about 10 millimicrons. The silica sol had excellent stability.

EXAMPLE 2

Using the procedure of Example 1, a 2% sodium silicate solution was used as the anolyte and 5% sodium hydroxide solution was used as the catholyte and electrodialysis was effected at a temperature of 40° to 50° C. at a voltage of about 30 volts. The pH was maintained at about 8 to 8.1 for the first six hours with sodium silicate addition and for the last hour with sodium hydroxide solution addition. The average particle size at the sixth hour was 6.7 millimicrons with a medium size of 4.6 millimicrons and 1 hour later the particle size was 7.2 millimicrons. The silica sol concentration was about 35 percent silica.

EXAMPLE 3

Figure 3:
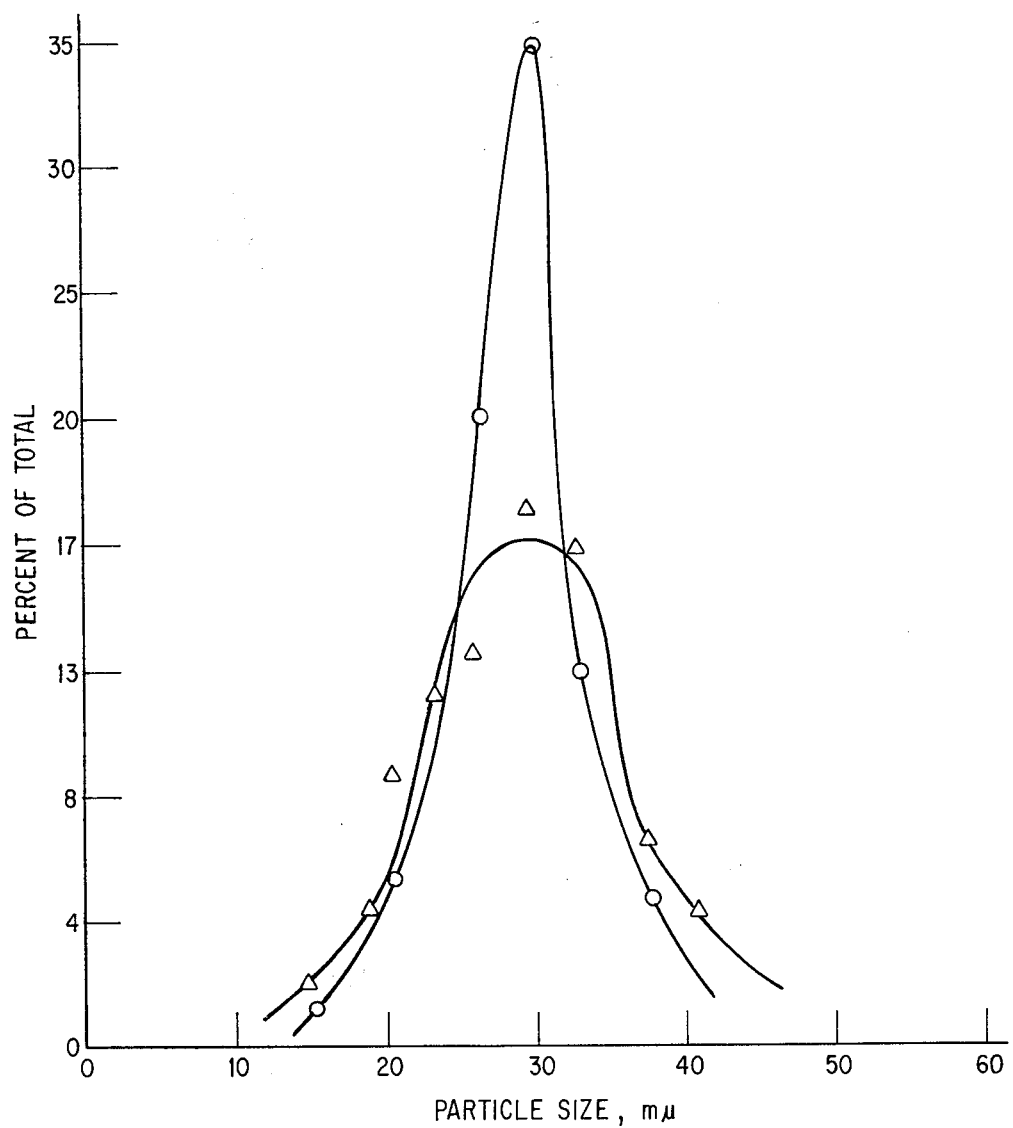
FIG. 3 is a graphic illustration showing a comparison particle size distribution.

The particle size distribution of a commercial 30% silica sol prepared by the ion-exchange method with an average particle size of 29.0 millimicrons was compared with a 30% silica sol prepared by the method of the invention with an average particle size of 19.5 millimicrons and as can be seen from FIG. 3 the range of the particle size was much narrower for the sol of the invention as compared to the sol of the ion exchange method. The curve resulting from the triangle points shows a commercial 30–90 silica sol prepared by ion-exchange and the curve resulting from the circle points represents a 30–90 silica sol prepared according to the present invention.

Various modifications of the products and processes of the invention may be made without departing from the spirit or scope thereof and it should be understood that the invention is intended to be limited only as defined in the appended claims.

What is claimed:

1. A process for controlling electrodialytically produced silica sol particle size within the range of 10 to 50 millimicrons and the concentration to within about 5 to about 50 weight percent comprising: providing an anolyte having a plurality of glass beads which are fluidized and impinge on the anode so as to substantially prevent the deposition of silica thereon; effecting electrodialysis of an alkali metal silicate anolyte in an electrodialysis cell with a cation permselective membrane separting the anolyte and the catholyte; adding alkali metal silicate solution to the anolyte to maintain the pH within the range of from about 7.5 to about 8.5 whereby a silica sol with increasing particle size is formed; and when the silica sol has reached the desired particle size in the range of 10 to 50 millimicrons, continuing electrodialysis with addition of an alkali metal hydroxide solution to control the pH until the silica sol has the desired concentration within the range of about 5 to about 50 weight percent.

2. The process of claim 1 wherein said alkali metal silicate is sodium silicate.

3. The process of claim 1 wherein the anolyte is maintained at a temperature of at least about 60° C.

4. The process of claim 1 wherein during electrodialysis a portion of the anolyte is removed and a portion of the anolyte which has been previously removed is returned thereto in a continuous manner.

5. The process of claim 1 wherein the pH is maintained in the range of 8.0 to 8.2.

6. The process of claim 1 wherein sodium hydroxide is the catholyte.

7. The process of claim 1 wherein the particle size is 20 to 30 millimicrons.

8. A stable silica sol with a substantially uniform particle size distribution produced by the process of claim 1.

9. A silica sol of claim 8 wherein the particle size is 20 to 30 millimicrons.

10. A silica sol of claim 8 which is sodium silicate.

* * * * *